(12) United States Patent
Magne

(10) Patent No.: US 6,419,860 B1
(45) Date of Patent: Jul. 16, 2002

(54) DEVICE FOR THE PRODUCTION OF OPTICAL LENSES OF POLYMERIZABLE MATERIAL

(75) Inventor: Jean François Magne, Kägiswil (CH)

(73) Assignee: ConcepcionLicence AG, Kagiswil (CH)

( * ) Notice: Subject to any disclaimer, the term of this patent is extended or adjusted under 35 U.S.C. 154(b) by 0 days.

(21) Appl. No.: 09/444,320

(22) Filed: Nov. 19, 1999

(30) Foreign Application Priority Data

Nov. 4, 1999 (WO) .................. PCT/IB99/01776

(51) Int. Cl.⁷ .................................................. B29D 11/00
(52) U.S. Cl. .................... 264/1.38; 249/117; 249/161; 264/1.36; 264/2.5; 425/808
(58) Field of Search ................. 264/1.1, 1.38, 264/2.3, 2.5, 1.36; 425/808, 174.4, 175; 249/117, 160, 161

(56) References Cited

U.S. PATENT DOCUMENTS

| | | |
|---|---|---|
| 3,763,290 A | 10/1973 | Shield |
| 3,931,373 A | 1/1976 | Beattie |
| 3,938,775 A | 2/1976 | Sarofeen ............ 249/102 |
| 3,940,304 A | 2/1976 | Schuler ............. 156/245 |
| 4,085,919 A | 4/1978 | Sullivan ............ 249/134 |
| 5,110,514 A | 5/1992 | Soane |
| 5,114,632 A | 5/1992 | Soane |
| 5,547,618 A | 8/1996 | Magne ............... 264/1.36 |
| 5,611,969 A | 3/1997 | Cano ................. 264/2.5 |
| 5,662,839 A | 9/1997 | Magne ............... 264/1.38 |
| 5,880,171 A | 3/1999 | Lim et al. ........... 523/106 |
| 6,068,464 A | 5/2000 | Su ................... 425/190 |

FOREIGN PATENT DOCUMENTS

| | | |
|---|---|---|
| DE | 3906564 | 12/1989 |
| WO | WO98/36868 | 8/1998 |
| WO | WO98/36898 | 8/1998 |

OTHER PUBLICATIONS

Patent abstracts of Japan vol. 006, No. 017 (M–109), Jan. 30, 1982 & JP 56 135032 A.

Primary Examiner—Mathieu D. Vargot
(74) Attorney, Agent, or Firm—Donald S. Dowden; Cooper & Dunham LLP (57) ABSTRACT

Described is a mold for producing optical lenses from a polymerizable material and a method for such production. Said mold comprises a gasket (1) enclosing an aperture (2), which aperture (2) extends along an axis (14), and providing a contact surface (3) radially extending from said aperture (2), a first molding shell (4) abutting against said contact surface (3), a second molding shell (5) arranged within said aperture (2) at a distance from said first molding shell (4), means (6) for pressing said first molding shell against said contact surface, means (7) for radially pressing said gasket against said second molding shell, and a filling opening, thereby forming a molding cavity (8) that can be filled with molding material between said first (4) and said second (5) molding shell and said gasket (1).

33 Claims, 5 Drawing Sheets

DEVICE FOR THE PRODUCTION OF OPTICAL LENSES OF POLYMERIZABLE MATERIAL

CROSS REFERENCE TO RELATED APPLICATIONS

This application claims the priority of PCT patent application PCT/IB99/01776, filed Nov. 4, 1999, the disclosure of which is incorporated herein by reference in its entirety.

TECHNICAL FIELD

The present invention concerns a device for the production of optical lenses, in particular ophthalmic lenses, of polymerizable material.

BACKGROUND OF THE INVENTION

Hitherto used methods for the manufacture of optical lenses comprises four steps, namely assembling a mold forming a cavity, filling said cavity with a molding material, polymerizing the molding material and removing the mold.

There are several optically acceptable materials known, e.g. the broadly used material called CR-39, a diethylene glycol bis (allyl carbonate) resin and CR 424, obtainable by PPG Industries, Inc., Pittsburgh, Pa. USA. Further materials are described in U.S. Pat. No. 5,880,171 (Lin et al.).

Also several filling methods are known such as e.g. described in U.S. Pat. Nos. 5,110,514 and 5,114,632 (both to Soane) and in U.S. Pat. Nos. 5,547,618 and 5,662,839 (of Magne).

For the mold also different systems are known. One system comprises two molding shells that are connected by an annular gasket surrounding them to form a mold with a cavity having the shape of the optical lens. This is the most classical method. The gasket, usually of thermoplastic material, insures the sealing of the two molding shells that have identical diameter and maintains them in the desired position (thickness, centering and prism). In general, a clip blocks the molding shells on the gasket.

The problem with this type of molding system is that
for each kind of lens, a different gasket has to be used, which implies complex management of a lot of tools,
the gasket usually is used only once and generally needs to be recycled to reduce costs.

The advantages of the gasket molding system are
the easiness to manually assemble the molding shells on the gasket,
the easiness to separate the lens from the mold when polymerization is achieved, namely e.g. with a spatula since the cavity formed by the molding shells and the gasket has a smaller diameter than the molding shells.

Another type of mold and method for making a lens is a method wherein the gasket is replaced by a tape. The mold in this quite popular method consists in two molding shells with identical diameter that are assembled not by a gasket but by surrounding the two molding shells on the edge by an appropriate tape. The tape, like the gasket, insures the sealing and the maintaining of the mold after positioning of the molding shells (thickness, centering and prism).

This method bears the disadvantage that
an automatic process has to be used (and thus developed) for positioning the molding shells and sticking the tape,
the molding shells cannot easily be removed by mechanical means, since they have exactly the same dimension as the lens.

Advantages of this method compared with the gasket method are that
with the same kind of tape, a lot of different geometries of lenses can be done,
the tape has relatively low volume and is available for relatively low costs, so: that no need to recycle said tape exists.

A further method is described in U.S. Pat. No. 5,547,618 and U.S. Pat. No. 5,662,839. Said method replaces the tape with two clamps that can be closed on the edge of the two molding shells having the same diameter. The two clamps, on their inner surface can be covered with a synthetic material.

The advantage of this system compared with the tape method is that no waste is generated since the sealing system is directly reusable. Furthermore all kind of geometries can be done as long as the same diameter is involved.

Disadvantages of this method are
the necessity to develop an automatic process for positioning the molds
the difficulty to separate the molding shell from the lens (see also "tape method" above).

Furthermore, if reduction of the number of molds is desired, with the above described methods a blank has to be produced that then is mechanically adapted to the desired optical features. While in such a case a reduction of the number of different shells is achieved, such a method has the disadvantage that a lot of lens material is wasted.

Thus there is still a need for a molding system requiring less different molding shells or reducing the need for mechanical treatment, respectively, and allowing easy handling.

BRIEF SUMMARY OF THE INVENTION

Hence, it is a general object of the present invention to provide a mold for producing optical lenses that, with the same parts, allows the production of several types of lenses.

Another object of the present invention is a method for producing optical lenses that uses said mold.

Now, in order to implement these and still further objects of the invention, which will become more readily apparent as the description proceeds, the mold is manifested by the features that it comprises
a gasket enclosing an aperture, which aperture extends along an axis, and providing a contact surface radially extending from said aperture,
a first molding shell abutting against said contact surface,
a second molding shell arranged within said aperture at a distance from said first molding shell,
at least one means for pressing said first molding shell against said contact surface,
at least one means for radially expanding said gasket or for radially pressing said gasket against said second molding shell or for radially expanding and radially pressing said gasket against said second molding shell, and
at least one filling opening,
thereby forming a molding cavity that can be filled with molding material between said first and said second molding shell and said gasket.

The mold for producing optical lenses of the present invention is primarily suitable for lenses made from a polymerizable synthetic material.

With the mold of the present invention it is furthermore possible to produce a broad variety of lens types with a minimum of molding shells. While the molding shells must be shaped for specific corrections such as monofocal lenses, multifocal lenses, progressive,lenses, toric lenses etc. or combinations thereof, with one: and the same pair of molding shells lenses of different thickness, dezentralization and prism can be formed.

Another aspect of the present invention is a method for the use of a mold of the present invention for the manufacturing of an optical lens from a polymerizable synthetic material comprising the steps of:

providing a mold within a molding device comprising a gasket enclosing an aperture, which aperture has an axis, and providing a contact surface radially extending from said aperture, a first molding shell and a second molding shell, at least one means for pressing said first molding shell against said contact surface of said gasket and at least one means for radially expanding said gasket or for radially pressing said gasket against said second molding shell or for radially expanding said gasket and for radially pressing said gasket against said second molding shell, forming a molding cavity by performing the steps of
a) providing a gasket with an aperture whereby the surface of the cross section of said aperture perpendicular to said axis (further on also referred to as perpendicular surface) is larger than the projected area of said second molding shell projected in the direction of said axis (further on also referred to as projected area),
b) positioning said second molding shell in said aperture enclosed by said gasket,
c) radially clamping said second,molding shell in position by releasing a forced radial expansion of said gasket or by radially pressing said gasket against said second molding shell by means of said at least one radially pressing means or by releasing said forced radial expansion of said gasket and by radially pressing said gasket against said second molding shell by means of said at least one radially pressing means,
d) forming a molding cavity by pressing said first molding shell against said contact surface of said gasket by means of said at least one pressing means for said first molding shell,
whereby the steps a) to d) can be performed in the following sequences a) prior b) prior c) prior d), or a) prior d) prior b) prior c), or a) prior b) prior d) prior c), or d) prior a) prior b) prior c)

filling said molding cavity through a filling opening in said molding cavity with molding material, performing at least partial polymerization of said molding material inside said molding cavity to form a lens, disassembling the mold and separating the lens.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

The mold for producing optical lenses of the present invention that is primarily suitable for lenses made from a polymerizable synthetic material comprises a gasket 1 enclosing an aperture 2, which aperture 2 extends along an axis 14, and providing a contact surface 3 radially extending from said aperture 2, a first molding shell 4 abutting against said contact surface 3, a second molding shell 5 arranged within said aperture 2 at a distance from said first molding shell 4, at least one means 6 for pressing said first molding shell 4 against said contact surface 3, at least one means 7 for radially expanding said gasket 1 or for radially pressing said gasket 1 against said second molding shell 5 or for radially expanding and radially pressing said gasket 1 against said second molding shell 5, and at least one filling opening 13, thereby forming a molding cavity 8 that can be filled with molding material between said first and said second molding shell and said gasket.

A gasket, as used in this text, is any means that connects the two molding shells to form a cavity. The gasket can be of one or several materials such as a one piece embodiment made of one material, but also e.g. two sealing parts on a support whereby said support can be part of the pressing means.

In order to get very tight contact and thereby a very good sealing, the gasket 1 preferably is of an elastomeric material, or of a combination of elastomeric materials with the same or different elasticity. Suitable materials are e.g. rubber like materials such as rubber and synthetic rubber. Preferably said elastomeric material has an elasticity sufficient to avoid stress within the molding shells. Suitable materials have e.g. a shore A hardness of 10 to 60, preferably a shore A hardness of 40.

A gasket of elastomeric material, besides of good sealing properties, allows to tilt at least one of the molding shells, thereby achieving—with the same molding shells—a lens with a prism.

In order to get good sealing properties, good separability and desired elasticity, as well as for cost reasons, the use of different materials with the same or different elasticity might be advantageous. such materials can be present e.g. in layers such as a thin layer of good separable material with lower elasticity over a thick layer of highly elastomeric material, or one material may be in contact with one molding shell while a second material is in contact with the second molding shell.

Whenever in the scope of the present invention the means 7 for expanding or pressing the gasket 1 to the molding shell 5 is mentioned, it has to be understood that said means 7 can be present as one piece or as several pieces, whereof one might simultaneously act as a support for the gasket 1, e.g. a clamp covered with elastomeric material forming a gasket (see the Figures).

Figure 6:
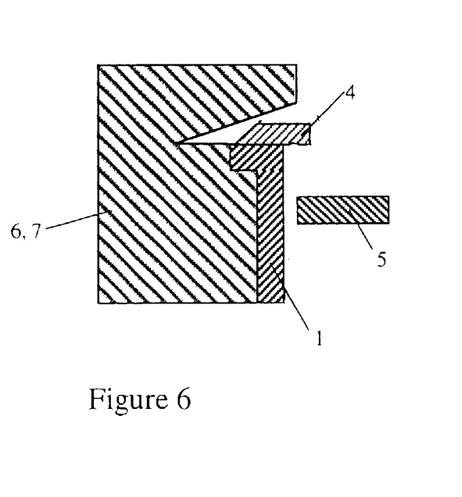
FIG. 6 is a cross-section through a mold with both pressing means embodied in one part, whereby a not yet fully assembled state is shown.

Also the expanding/pressing means 6, 7 can be formed as one part or as several parts, whereby each combined means 6,7 simultaneously acts as means 6 and as a means 7. In a specific embodiment shown in FIG. 6, both expanding/pressing means 6,7 are combined to one means shaped thus that is can expand/release and/or press the gasket to the second molding shell as well as press the first molding shell to the contact surface 3. It is of course also within the scope of the present invention that more than one combined pressing means 6,7 or combined expanding and pressing means 6,7 are present.

In a much preferred embodiment the projected area of the first molding shell 4 projected in the direction of the axis 14 of the aperture is bigger than the projected area of the second molding shell 5 projected in said direction. This enables easy decentralizing of the optical center, namely by a mere movement of the first molding shell 4 in a direction about perpendicular to the axis 14, whereby due to the larger size, such decentralizing is possible without loosing the sealing contact to the contact surface (see e.g. FIGS. 1 and 2).

The gasket 1 of the inventive mold is preferably formed thus that the cross section of said aperture perpendicular to said axis of said aperture is of continuous shape, i. e. for a round aperture of cylindrical shape.

In another preferred embodiment the shape and surface of the cross section of the aperture 2 perpendicular to the axis 14 of said aperture in the area where the gasket 1 radially contacts the second molding shell 5 axially extends over said contact area, thereby permitting easy positioning of the second molding shell at diverse distances and angles to said first molding shell. For a circular shape, this means a cylindrical shape in the specified region (possible contact area to second mold and cavity).

For some purposes, however, it might also be advantageous to alter the shape of the gasket 1 in the area where the gasket radially contacts the second molding shell 5 and axially extends towards the first molding shell 4. If, for example, molding shells with not a round shape were used but with a shape with several edges, then a change in the shape of the gasket and/or the orientation of said shape in the part forming the cavity, and thus the lens, might be advantageous, e.g. to separate the lens from the molding shell by applying mechanical forces, such as shear force, or—in the case that an insert is generated—by the application of a spatula to generate high transverse loading at the interface molding shell/lens.

For reasons of broad applicability it is preferred that the aperture is of cylindrical shape so that round lenses are formed and the thickness of the lens can easily be changed. For application of different tilting angles, however, conical shapes might be considered.

In another much-preferred embodiment of the present invention the contact surface 3 is provided by a flange radially extending from the aperture 2. By providing such a flange, the sealing surface 3 to the first molding shell 4 can be enlarged without needing as much elastomeric material as were required to provide an as large surface by enhancing the thickness of the whole layer of elastomeric material. Said contact surface 3 preferably is a substantially plane surface. If the flange extends away from the axis 14 and if the first molding shell 4 is larger than the second molding shell 5 (see FIGS. 1 and 2), then the smallest amount of molding material is needed without reducing the variability of the lens shapes obtainable with the same mold forming parts.

Figure 1A:
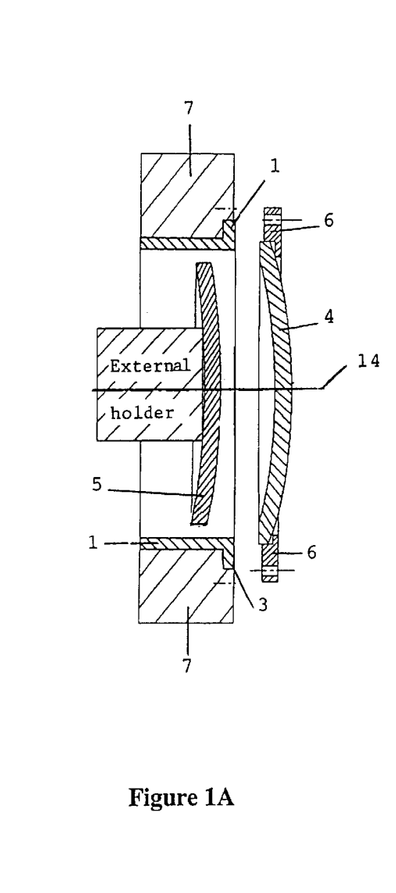
FIG. 1A is a cross-section of a mold of the present invention in a disassembled state with a one part gasket having an aperture with a cross section perpendicular to the axis that is larger than the projected area of the second molding shell projected in the direction of said axis due to either a radial expansion or a respectively formed gasket.
Figure 1B:
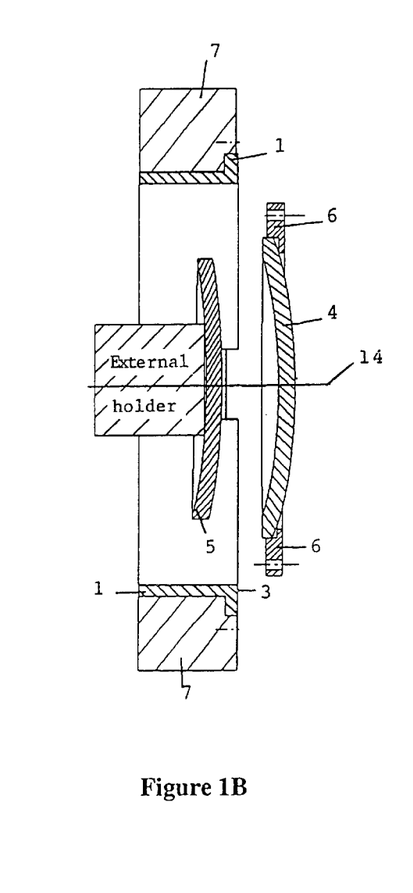
FIG. 1B is a cross-section of a mold of the present invention with a divisible gasket in a disassembled state.
Figure 1C:
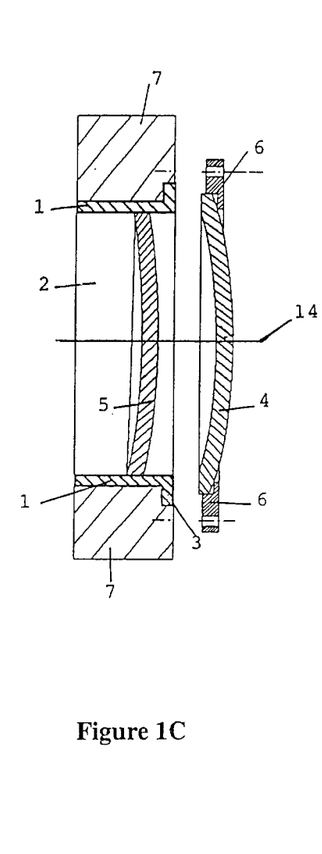
FIG. 1C is a cross-section of the mold of FIG. 1A and FIG. 1B in a partially assembled state with the gasket already pressed to one of the molding shells.
Figure 1D:
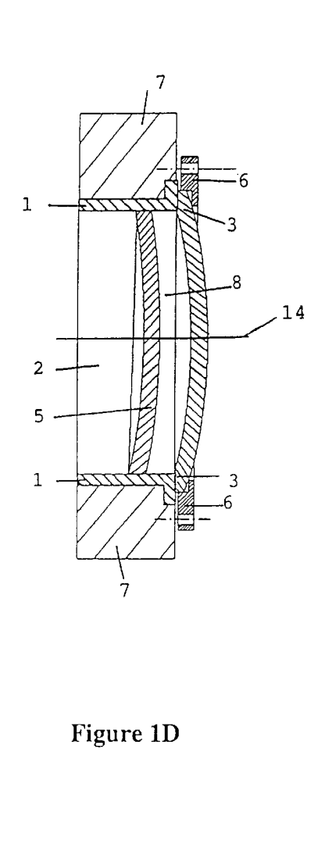
FIG. 1D is a cross-section of the same molds as FIGS. 1A to 1C in a fully assembled state.
Figure 2A:
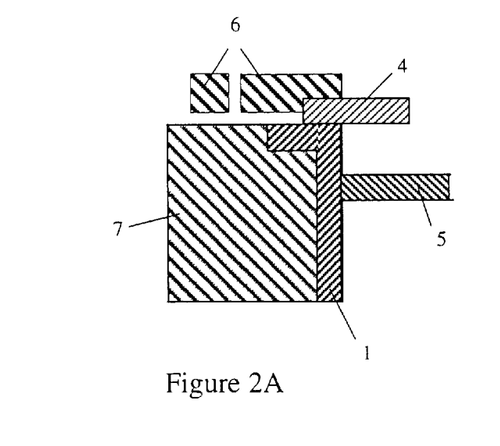
FIG. 2A is a cross-section of a part of a fully assembled mold with a contact surface extending away from the aperture and with both molding shells in a centralized state.
Figure 2B:
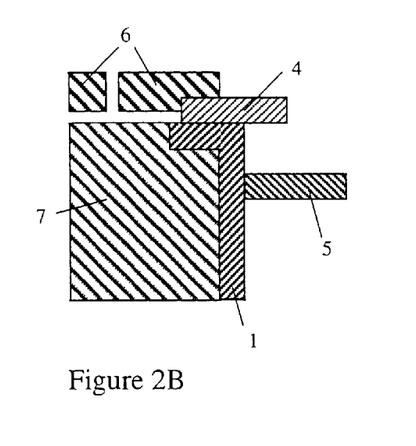
FIG. 2B is a cross-section of the mold shown in FIG. 2A with one shell in an off-center position (decentralized)
Figure 3:
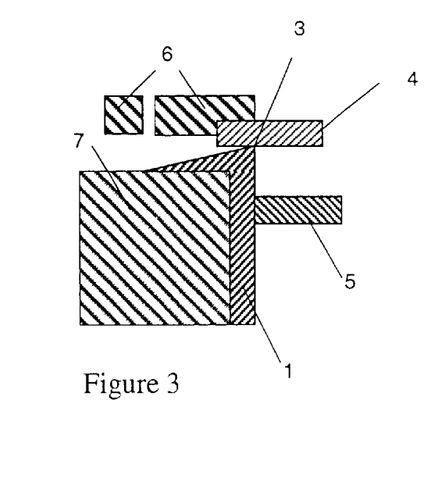
FIG. 3 is another embodiment of the gasket wherein the contact surface radially extending from the aperture is very small due to not being exactly perpendicular to the axis.
Figure 4A:
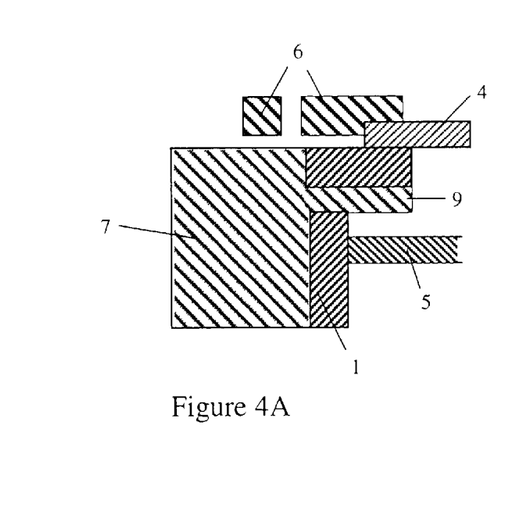
FIG. 4A is a cross-section of a mold with the contact surface extending "into" the aperture and with both molding shells centralized.
Figure 4B:
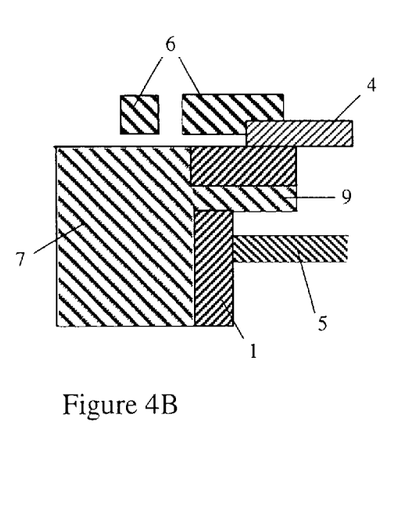
FIG. 4B is a cross-section of the same mold as shown in FIG. 4A with one shell in off-center position (decentralized)
Figure 5A:
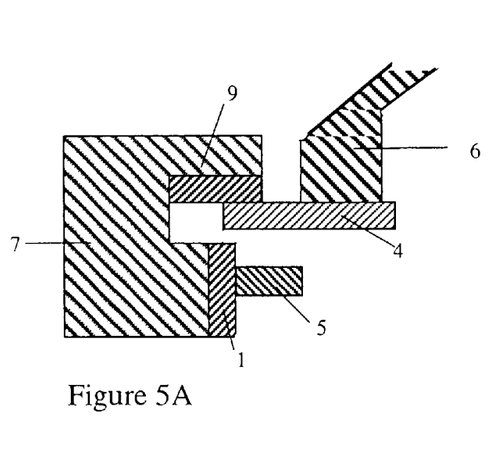
FIG. 5A is a cross-section of a mold with a tracting element as means for pressing one shell to the contact surface, and with only the relevant parts covered by elastomeric material.
Figure 5B:
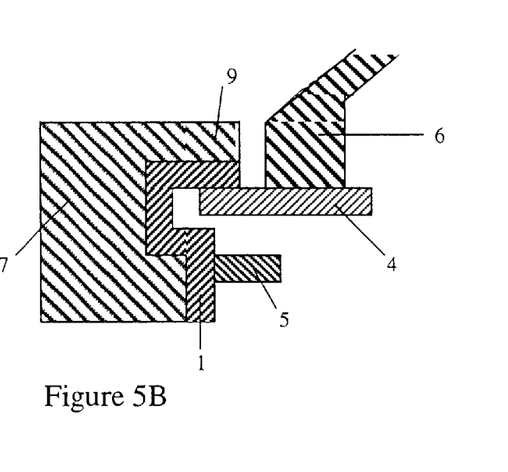
FIG. 5B is a cross-section through an embodiment as shown in FIG. 5A but with the whole gasket part of elastomeric material.

Although the radially extending contact surface 3 of the gasket 1 preferably extends away from the aperture 2, (see FIGS. 1 and 2) it is also possible to extend said contact surface into the aperture (see FIGS. 4 and 5). Such an embodiment offers two places to position the first molding shell 4. In such embodiment, the contact surface 3 much preferably is supported by part 9 of the support or pressing means 7,respectively. The FIGS. 4 and 5 show such a part of the support covered by elastomeric material on one side forming a flange. In order to provide both positioning possibilities for the first molding shell, however, the support can also be provided within an elastic layer providing said radially extending contact surface 3. Furthermore, also in such embodiments, the contact surface preferably is substantially perpendicular to said axis 14 of said aperture 2. This embodiment of the contact surface 3 allows easy decentering of the first molding shell 4, however, it is less preferred for UV-curing lens material since the edge region is UV accessible from at most one side.

In order to readily permit an off-center positioning of the first molding shell 4 with regard to the axis 14 of the aperture 2, and to provide easy access to UV radiation from both sides, it is preferred that the contact surface 3 radially extends over the radial dimension of the first molding shell 4 and away from the axis. Such embodiment is e.g. preferred in view of the simple form of the gasket (see FIGS. 1 and 2).

In some preferred embodiments, the first molding shell 4 can be removed without enhancing the surface of the cross section of the aperture 2 perpendicular to the axis 14 of said aperture 2 by removing pressure applied to radially press the gasket 1 to the second molding shell 5 or by expanding or parting said gasket 1 (see e.g. FIGS. 1,2,3 and 4).

For an optimal sealing, the edging area of the first molding shell 4 that abuts to the contact surface 3 of the gasket 1 forms a plane surface perpendicular to the axis 14 of the aperture 2, whereby the surface of the edge of said second molding shell 5 preferably is parallel to said axis 14.

Usually, the gasket 1 is supported by a thereon-fitting means, also called support, for expanding and/or pressing the gasket 1 to the molding shell 5, whereby said means can form part of the gasket 1 and/or the pressing means 7.

The gasket 1, in particular if it is highly elastic, can be formed in one part, i.e. as single element, either with an axial slit for providing divisibility or without a slit. If the gasket has no slit, the means 7 can be an expanding means enabling an enlargement of the aperture to a surface of the cross section of said aperture 2 perpendicular to said axis 14 of said aperture 2 (also referred to as perpendicular surface) sufficient to allow positioning of the second molding shell 5. If the elasticity of the gasket 1 is suitable to allow sufficient sealing if the perpendicular surface is reduced by application of radial pressure, then the gasket can have an aperture with a perpendicular surface in non-expanded state that is larger than the projected area of the second molding shell 5. Dependent on the elasticity of the gasket 1 and of the perpendicular surface of the aperture 2 in an enlarged state, it may be favorable to use a gasket 1 with an aperture 2 with a perpendicular surface larger than the projected area of the second molding shell 5 and to first radially expand said gasket 1 to facilitate the positioning of the second molding shell 5, then to release the radial expansion of the gasket 1 and to apply radial pressure to said gasket 1.

In another embodiment of a one part gasket, however with a slit, the fitting means or support, e.g. a part of the means for pressing the gasket to the molding shell, may be e.g. two parts optionally connected on one side by a connecting means such as a hinge, whereby the second contact zone is in the area of the slit in the gasket.

For a lot of applications and materials it may, however, be advantageous that the gasket 1 is formed by at least two segments allowing their radial separation. Two segments provide the advantage that the access to the aperture 2 is improved due to the possibility to gain space by separating said segments. By using three segments, in the case of a symmetric aperture 2 preferably three identical segments, the stress within the molding shell can be minimized.

The fitting means or support can be provided with a fixing means to fix it onto a pressing means, or it can be permanently fixed to such pressing means. In any case, it can be part of the gasket 1 as well as part of the pressing means 7.

The means 6 pressing the first molding shell 4 to the contact surface 3 may be or contain a circle shaped means placed on the molding shell 4 in the area of contact with the contact surface 3; a "hood" covering the surface of the molding shell 4 that is opposite to the cavity 8; or a three-legs, five-legs or other multi-legs device with said legs regularly placed on the molding shell 4. Instead of one pressing means with several legs or segments of course also several pressing means, e.g. one for each leg or segment or for a part of said legs or segments may be used. The pressing means 6 or part thereof can be fixed on the first molding shell 4, e.g. permanently by fixation with an adhesive, or dividably by e.g. a mechanical means, such as at least one slot in the edging area of the molding shell and at least one engaging nose on the pressing means 6, or vice versa. Such fixed pressing means 6 can simultaneously act as positioning means. However, the pressing means 6 can also be such that it is not fixed on the molding shell 4. For such cases, a molding device comprising said mold may comprise a separate positioning means allowing the positioning of the first shell 4 on the contact surface 3. Such positioning means may e.g. be a positioning means fixing the molding shell by vacuum. The one or more pressing means 6 can be designed thus that it/they can apply different forces on different edging parts of the molding shell 4 thereby achieving a tilted position of said molding shell 4 with regard to the usual position perpendicular to the axis 14.

The mold can be situated according to everybody's desire. However, if the mold is situated thus that the axis 14 of the aperture 2 is in a horizontal position, then it is preferred that the at least one, and usually one, filling opening 13 is between the molding shells in a position allowing the filling from bottom to top. Although filling under pressure is possible it is preferred to either first evacuate the mold or to provide an air/gas outlet at the top of the mold.

The mold can also be positioned thus that the axis of the aperture is in a vertical position. In this case, in order to avoid bubbles or to provide a homogenous filling, respectively, the mold should be positioned thus that the deepest point of the mold is around the middle of the mold whereby the filling opening preferably is in the gasket 1 between the molding shells 4,5.

The mold of the present invention can be part of a molding device further comprising means for positioning the second molding shell and means at least partially curing the polymerizable material in the mold. Such curing means can provide radiation, such as e.g ultra violet(UV) radiation, ultra sound(US) radiation, or infrared(IR) radiation, or they can just provide heat, such as e.g. one or more heating coils, possibly integrated within at least one of the molding shells. In the case of a heating coil integrated into a molding shell, said shell is preferably formed, at least in direct contact with the coil and the polymerizable material, of a highly heat conducting material.

A device designed for using such material comprises at least one curing means such as a radiation source, e.g. a UV source, that is positioned in axial direction outside the mold on the side of the first molding shell 4 and/or on the side of the second molding shell 5. Dependent on the material used and/or the lens shape, the curing means can be either fixed (preferably on the axis through the aperture) or it can be movably situated, allowing e.g. to move said at least one curing means in filling direction. It is of course also possible to use several suitably positioned curing means on the same side of each molding shell in order to improve the curing by providing homogenous radiation. In addition, it is also possible to position a mask between the source of radiation and the lens which mask may be movable or not.

Besides of at least partially UV curing materials and heat curing materials any other kind of optically suitable material can be used, such as multi-component, preferably two-component materials etc., provided that they have sufficient shelf life, are sufficiently flowable, i.e. have acceptable viscosity, and are acceptably fast curing.

Since the cavity 8 has to be filled with the liquid monomer, the most important physical parameter of the monomer for this step is the viscosity. It is usual that, when the refractive index of the formulation increases, the viscosity increases too.

When the viscosity is low, the process for filling is quite easy because self-convection in such a liquid permits that bubbles or other defects created during the filling step can quickly disappear. On another hand, when the viscosity is high, what means about 100 cps at 20° C or more, there is mostly no more self-convection in the liquid. As a result, only a diffusion process that is rather slow for an industrial purpose could reach the disappearance of any defects (like bubbles etc.) created in the molding material during the filling step.

The molding shells can be of different materials, provided that such material is suitable for the curing of the polimerizable material used. For UV curing, molding shells of glass are preferred. However also compatible and sufficiently UV transmittable polymeric materials can be used. The use of expensive quartz is not needed since most materials cure in an UV range not inadmissibly absorbed by glass. For ecological and economical reasons, it is of course preferred that the material is suitable for several applications.

Although usually such surfaces of the molding shells are used that lead to smooth lens surfaces, it is of course also possible to use shaped surfaces providing the therewith produced lenses with a specific optical effect.

Figure 7:
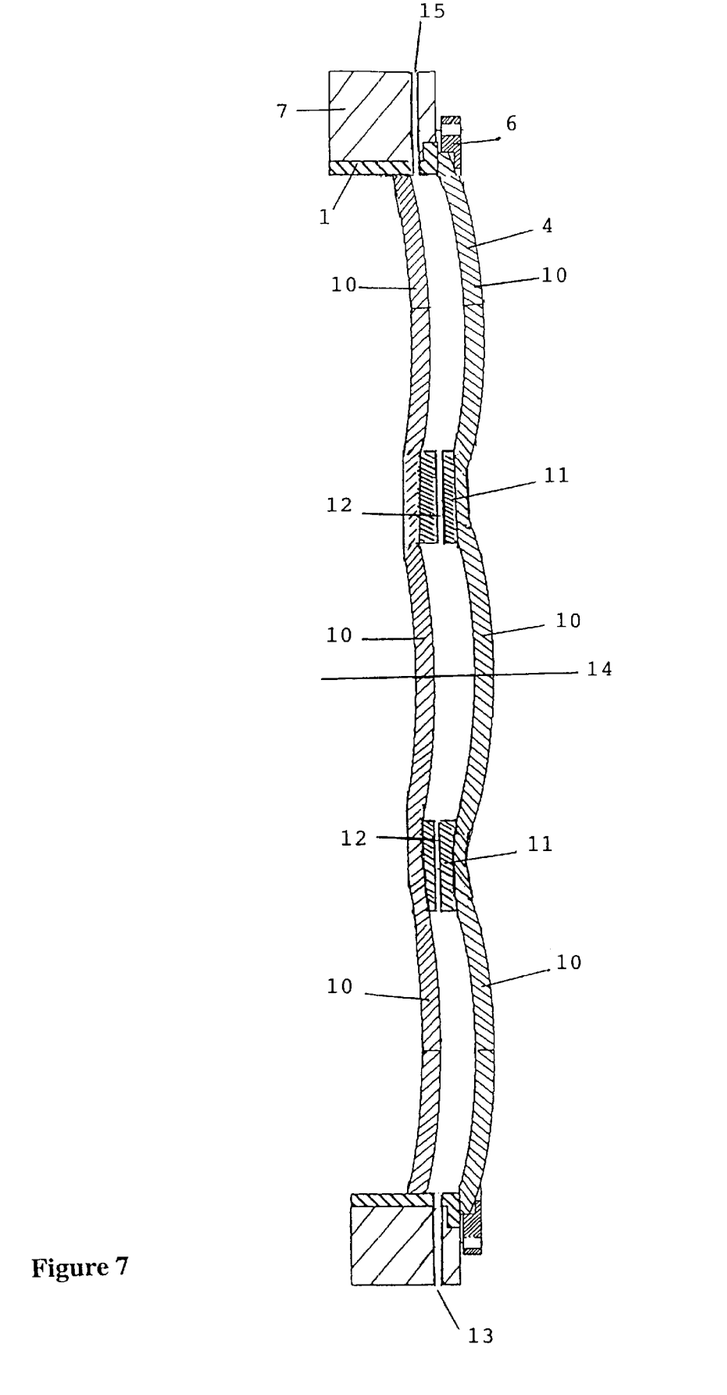
FIG. 7 is a cross-section through an embodiment allowing simultaneous production of several lenses, wherein both molding shells comprise several lens-shaped forms.
Figure 8:
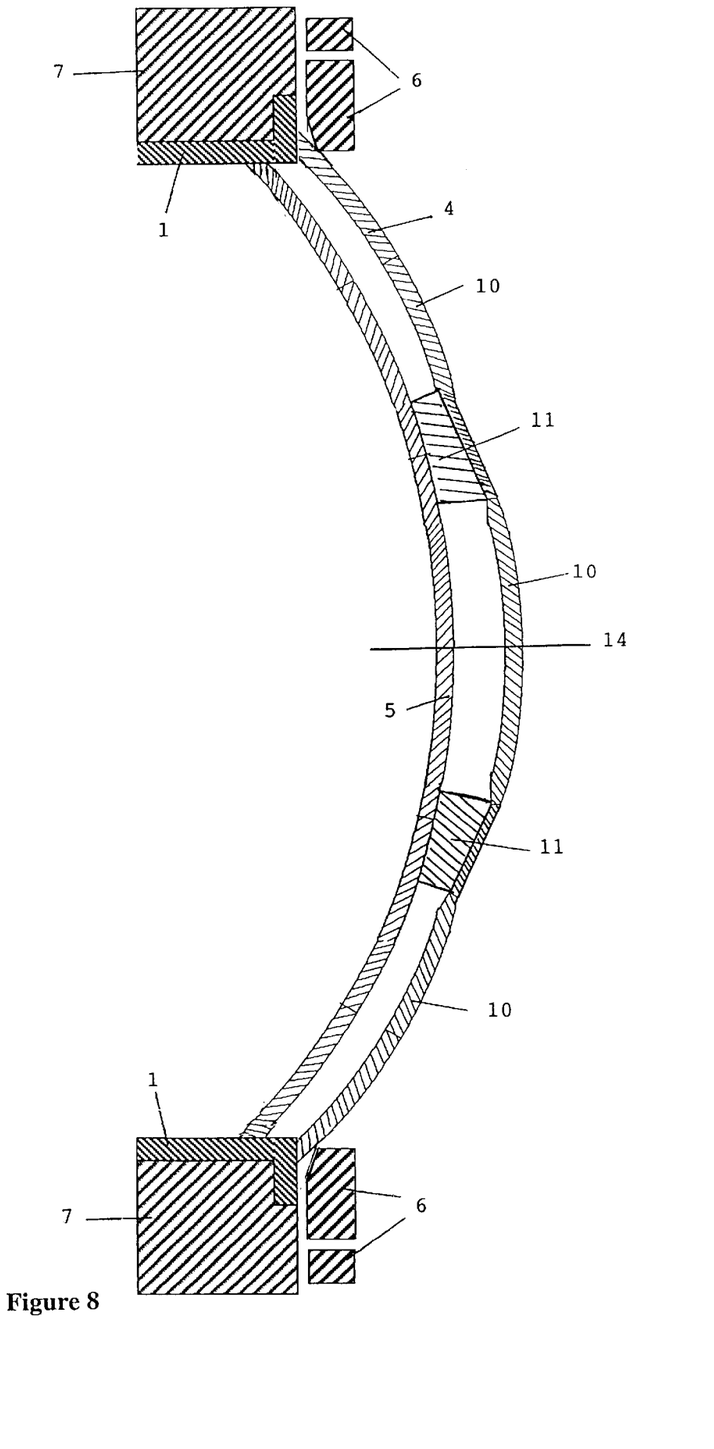
FIG. 8 is also a cross-section through an embodiment allowing simultaneous production of several lenses, where here only one molding shell comprises several lens-shaped forms, while the second molding shell has a continuous shape.

The mold of the present invention, besides of the usual embodiment allowing the production of one lens per mold, can easily be adapted to allow for the simultaneous production of more than one lens of different or identical type (see FIGS. 7 and 8). For such a production at least one molding shell has to be provided with several lens-shaped forms 10, each form being separated from its neighbors in the assembled state by a separating means 11 thus that the separating means with one lens shaped form in at least one molding shell and a part of the second molding shell (see FIG. 8), that optionally has also a lens-shaped form (see FIG. 7), forms a lens-shaped aperture. In order to fill such a mold, the separating means must comprise small apertures 12 allowing the polimerizable material to fill each lens-shaped aperture, preferably in line with a filling opening 13 and possibly an air/gas outlet 15.

Another aspect of the present invention is a method for the use of a mold of the present invention for the manufacturing of an optical lens from a polymerizable material comprising the steps of:

providing a mold within a molding device comprising a gasket 1 enclosing an aperture 2, which aperture has an axis 14, and providing a contact surface 3 radially extending from said aperture 2, a first molding shell 4 and a second molding shell 5, at least one means 6 for pressing said first molding shell 4 against said contact surface 3 of said gasket 1 and at least one means 7 for radially expanding said gasket 1 or for radially pressing said gasket 1 against said second molding shell 5 or for radially expanding said gasket 1 and for radially pressing said gasket 1 against said second molding shell 5, forming a molding cavity by performing the steps of a) providing a gasket 1 with an aperture 2 whereby the surface of the cross section of said aperture 2 perpendicular to said axis 14 is larger than the projected area of said second molding shell 5 projected in the direction of said axis 14, b) positioning said second molding shell 5 in said aperture 2 enclosed by said gasket 1, c) radially clamping said second molding shell 5 in position by releasing a forced radial expansion of said gasket 1 or by radially pressing said gasket 1 against said second molding shell 5 by means of said at least one radially pressing means 7 or by releasing said forced radial expansion of said gasket 1 and by radially pressing said gasket 1 against said second molding shell 5 by means of said at least one radially pressing means 7, d) forming a molding cavity 8 by pressing said first molding shell 4 against said contact surface 3 of said gasket 1 by means of said at least one pressing means 6 for said first molding shell 4, whereby the steps a) to d) can be performed in the following sequences a) prior b) prior c) prior d), or a) prior d) prior b) prior c), or a) prior b) prior d) prior c), or d) prior a) prior b) prior c)

filling said molding cavity 8 through a filling opening 13 in said molding cavity 8 with molding material, performing at least partial polymerization of said molding material inside said molding cavity 8 to form a lens, disassembling the mold and separating the lens.

The molding cavity forming steps can be performed in any sequence, whereby the sequence a) prior b) prior c) prior d) is generally applicable whereas the other sequences can only be applied if the pressure ensuring the sealing of the first molding shell 4 to the surface 3 allows radial movements of the gasket 1.

The disassembling of the mold can be performed by e.g. first removing one of the means to press the first molding shell to the contact surface or the gasket to the second molding shell and then separating the molding shells e.g. by thermal shock while one of the pressing means or part thereof is still in place, usually the means pressing the molding shell to the gasket. In another embodiment, first both pressing means are removed. Leaving a part of a pressing means on the molding shell may be advantageous if the correct fixing of the molding shell in or on the pressing means is critical, so that it might be favorable to fix the molding shell on a holder or support being an easily separable and connectable part of the pressing means.

After filling the mold, polymerization can be effected by several means such as e.g. radiation, for example by application of UV, US, IR and/or heat.

Within the fully assembled mold, the polymerization usually is only performed to the level of pre-polymerization. This pre-polymerization level at least is up to the gel point allowing the removal of the gasket. Most often, the pre-polymerization is performed to a higher degree, allowing not only the removal of the gasket but the full disassembling of the mold, i.e. the removal of the gasket and the molding shells. If an at least partial overhang or insert, respectively, exists with regard to at least one molding shell, said shell can be separated by mechanical means, e.g. a spatula. If the form allows the application of shear forces, also separation by shearing can be suitable. Otherwise, high transverse loading at the interface molding shell/lens can be applied, e.g. by a suitably shaped vice. Another method is thermal shock in a liquid or in air, e.g. by cooling to about 15° C. The final curing—if at all needed—can be performed outside the mold (and thus the device) and optionally even outside the shells at room temperature or in an oven, dependent on the material used.

While there are shown and described presently preferred embodiments of the invention, it is to be distinctly understood that the invention is not limited thereto but may be otherwise variously embodied and practiced within the scope of the following claims.

What is claimed is:

1. A mold for producing optical lenses from a molding material comprising a gasket enclosing an aperture, which aperture extends along an axis, and providing a contact surface radially extending from said aperture, a first molding shell abutting against said contact surface, a second molding shell arranged within said aperture at a distance from said first molding shell, at least one means for pressing said first molding shell against said contact surface, at least one means for radially expanding said gasket or for radially pressing said gasket against said second molding shell or for radially expanding and radially pressing said gasket against said second molding shell, and at least one filling opening, thereby forming a molding cavity that can be filled with molding material between said first and said second molding shell and said gasket.

2. The mold of claim 1 whereby the gasket is made of an elastomeric material.

3. The mold of claim 1 whereby the projected area of said first molding shell projected in the direction of said axis of said aperture is bigger than the projected area of said second molding shell projected in said direction.

4. The mold of claim 1 wherein the cross section of said aperture perpendicular to said axis of said aperture is of continuous shape.

5. The mold of claim 1 wherein the shape and surface of the cross section of said aperture perpendicular to said axis of said aperture in the area where said gasket radially contacts said second molding shell axially extends over said contact area, thereby permitting positioning of the second molding shell at diverse distances and angles to said first molding shell.

6. The mold of claim 1 wherein said aperture is of substantially cylindrical shape.

7. The mold of claim 1 wherein said aperture is of conical shape.

8. The mold of claim 1 wherein said contact surface is provided by a flange radially extending from said aperture.

9. The mold of claim 1 wherein said contact surface is a substantially plane surface.

10. The mold of claim 1 wherein said contact surface is substantially perpendicular to said axis of said aperture.

11. The mold of claim 1 wherein said contact surface radially extends over the radial dimension of said first molding shell, thereby permitting an off-center positioning (decentralization) of said first molding shell with regard to said axis of said aperture.

12. The mold of claim 1 wherein said first molding shell can be removed without enhancing the surface of the cross section of said aperture perpendicular to said axis of said aperture by removing pressure radially applied to press said gasket to said second molding shell or by parting or expanding said gasket.

13. The mold of claim 1 wherein the edging area of said first molding shell that abuts to said contact surface of said gasket forms a plane surface perpendicular to said axis of said aperture.

14. The mold of claim 1 wherein the surface of the edge of said second molding shell that abuts to said gasket is substantially parallel to said axis of said aperture.

15. The mold of claim 1 wherein the gasket is formed by at least two segments.

16. The mold of claim 1 wherein the gasket is formed by three segments.

17. The mold of claim 1 wherein the gasket is formed by a single element.

18. The mold of claim 1 wherein the filling opening is situated at the bottom of the mold.

19. The mold of claim 1 wherein the gasket is made of an elastomeric material with an elasticity sufficient to avoid stress within the mold forming parts.

20. A molding device comprising a mold of claim 1, means for positioning the second molding shell, and at least one means for at least pre-curing the molding material.

21. Method for the use of a mold of claim 1 for the manufacturing of an optical lens from a polymerizable synthetic material comprising the steps of:

providing a mold within a molding device comprising a gasket enclosing an aperture, which aperture has an axis, and providing a contact surface radially extending from said aperture, a first molding shell and a second molding shell, at least one means for pressing said first molding shell against said contact surface of said gasket and at least one means for radially expanding said gasket or for radially pressing said gasket against said second molding shell or for radially expanding said gasket (1) and for radially pressing said gasket against said second molding shell, forming a molding cavity by performing the steps of
a) providing a gasket with an aperture whereby the surface of the cross section of said aperture perpendicular to said axis is larger than the projected area of said second molding shell projected in the direction of said axis,
b) positioning said second molding shell in said aperture enclosed by said gasket,
c) radially clamping said second molding shell in position by releasing a forced radial expansion of said gasket or by radially pressing said gasket against said second molding shell by means of said at least one radially pressing means or by releasing said forced radial expansion of said gasket and by radially pressing said gasket against said second molding shell by means of said at least one radially pressing means,
d) forming a molding cavity by pressing said first molding shell against said contact surface of said gasket by means of said at least one pressing means for said first molding shell,
whereby the steps a) to d) can be performed in the following sequences a) prior b) prior c) prior d), or a) prior d) prior b) prior c), or a) prior b) prior d) prior c), or d) prior a) prior b) prior c)

filling said molding cavity through a filling opening in said molding cavity with molding material, performing at least partial polymerization of said molding material inside said molding cavity to form a lens, disassembling the mold and separating the lens.

22. The method of claim 21 wherein the sequence of the molding cavity forming steps is a) prior b) prior c) prior d).

23. The method of claim 21 wherein the sequence of the molding cavity forming steps is a) prior d) prior b) prior c).

24. The method of claim 21 wherein the sequence of the molding cavity forming steps is a) prior b) prior d) prior c).

25. The method of claim 21 wherein the polymerization is effected by application of radiation.

26. The method of claim 25 wherein the radiation is UV radiation.

27. The method of claim 21 wherein the polymerization is effected by application of heat.

28. The method of claim 21, wherein the filling is made by an opening in the bottom of the mold.

29. The method of claim 21, wherein the disassembling is performed by removing the pressing means either one after the other or simultaneously.

30. The method of claim 21, wherein the lenses are separated by application of thermal shock.

31. The method of claim 21, wherein the lenses are separated by the application of high transverse loading at the interface molding shell/lens.

32. The mold of claim 19 wherein the elastomeric material has a shore A hardness within the rage of 10 to 60.

33. The mold of claim 19 wherein the elastomeric material has a shore A hardness of about 40.

* * * * *